United States Patent
Park et al.

(10) Patent No.: US 11,417,293 B2
(45) Date of Patent: Aug. 16, 2022

(54) DISPLAY DEVICE AND IMAGE PROCESSING METHOD THEREOF

(71) Applicant: LG ELECTRONICS INC., Seoul (KR)

(72) Inventors: Kyeongryeol Park, Seoul (KR); Yeonoh Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 37 days.

(21) Appl. No.: 16/978,881

(22) PCT Filed: Mar. 13, 2018

(86) PCT No.: PCT/KR2018/002935
§ 371 (c)(1),
(2) Date: Sep. 8, 2020

(87) PCT Pub. No.: WO2019/172478
PCT Pub. Date: Sep. 12, 2019

(65) Prior Publication Data
US 2020/0410956 A1 Dec. 31, 2020

(30) Foreign Application Priority Data
Mar. 8, 2018 (KR) .................. 10-2018-0027437

(51) Int. Cl.
*G09G 5/06* (2006.01)
*G06T 11/00* (2006.01)
*H04N 1/60* (2006.01)
*H04N 9/64* (2006.01)

(52) U.S. Cl.
CPC .............. *G09G 5/06* (2013.01); *G06T 11/001* (2013.01); *H04N 1/60* (2013.01); *H04N 9/64* (2013.01); *G09G 2320/0666* (2013.01); *G09G 2340/06* (2013.01)

(58) Field of Classification Search
CPC .... G09G 5/06; G09G 5/10; G09G 2320/0666; G09G 2340/06; G06T 11/001; H04N 1/60
See application file for complete search history.

(56) References Cited

U.S. PATENT DOCUMENTS

2011/0169856 A1* 7/2011 Park .................... G09G 3/3607
345/589

FOREIGN PATENT DOCUMENTS

| JP | 8-274997 A | 10/1996 |
|---|---|---|
| JP | 2007-17862 A | 1/2007 |
| JP | 2007017862 A * | 1/2007 |
| JP | 2012-65089 A | 3/2012 |

(Continued)

*Primary Examiner* — Robert J Michaud
(74) *Attorney, Agent, or Firm* — Birch, Stewart, Kolasch & Birch, LLP

(57) ABSTRACT

A display device according to an embodiment of the disclosure comprises: a linear gamut mapping unit for deriving a linear gamut mapping result for matching a gamut of an input image signal to a target display gamut; a non-linear gamut mapping unit for deriving a non-linear gamut mapping result for matching the gamut of the input image signal to the target display gamut; and a mixing unit for generating an output image signal by mixing the linear gamut mapping result and the non-linear gamut mapping result. The disclosure may provide an optimal gamut mapping result that is intended by a user and an originator.

14 Claims, 8 Drawing Sheets

(56) References Cited

FOREIGN PATENT DOCUMENTS

KR      10-1342324 B1    12/2013
KR      10-1600495 B1     3/2016

\* cited by examiner

[Figure 1]
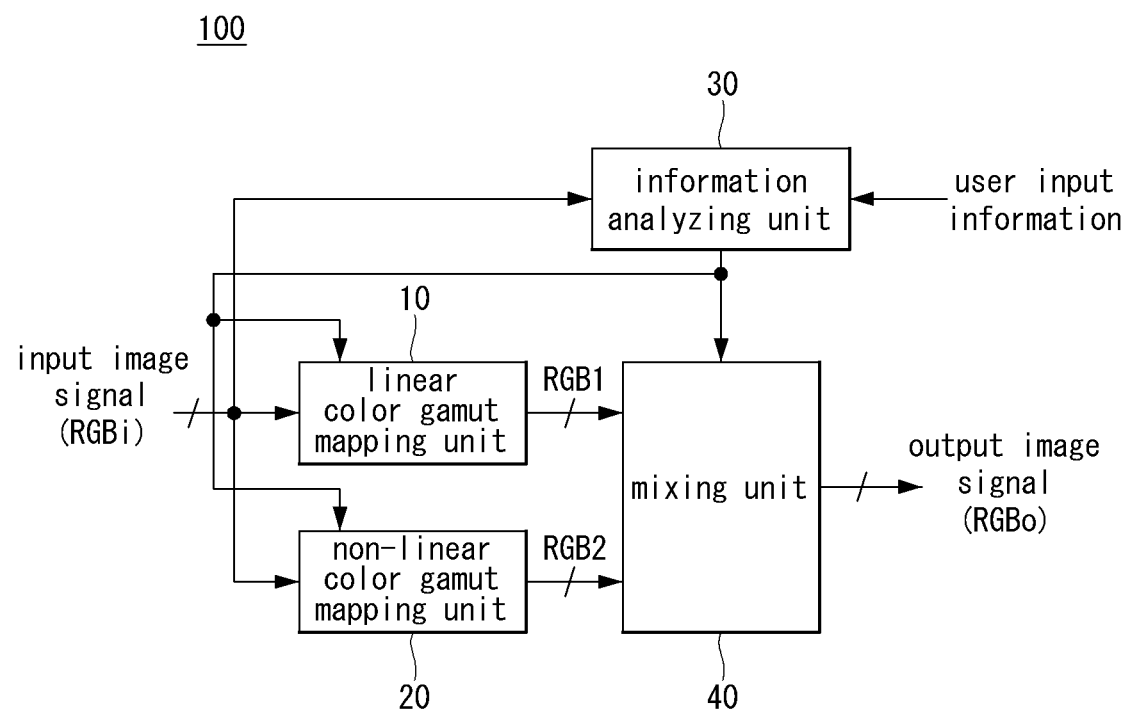

[Figure 2]
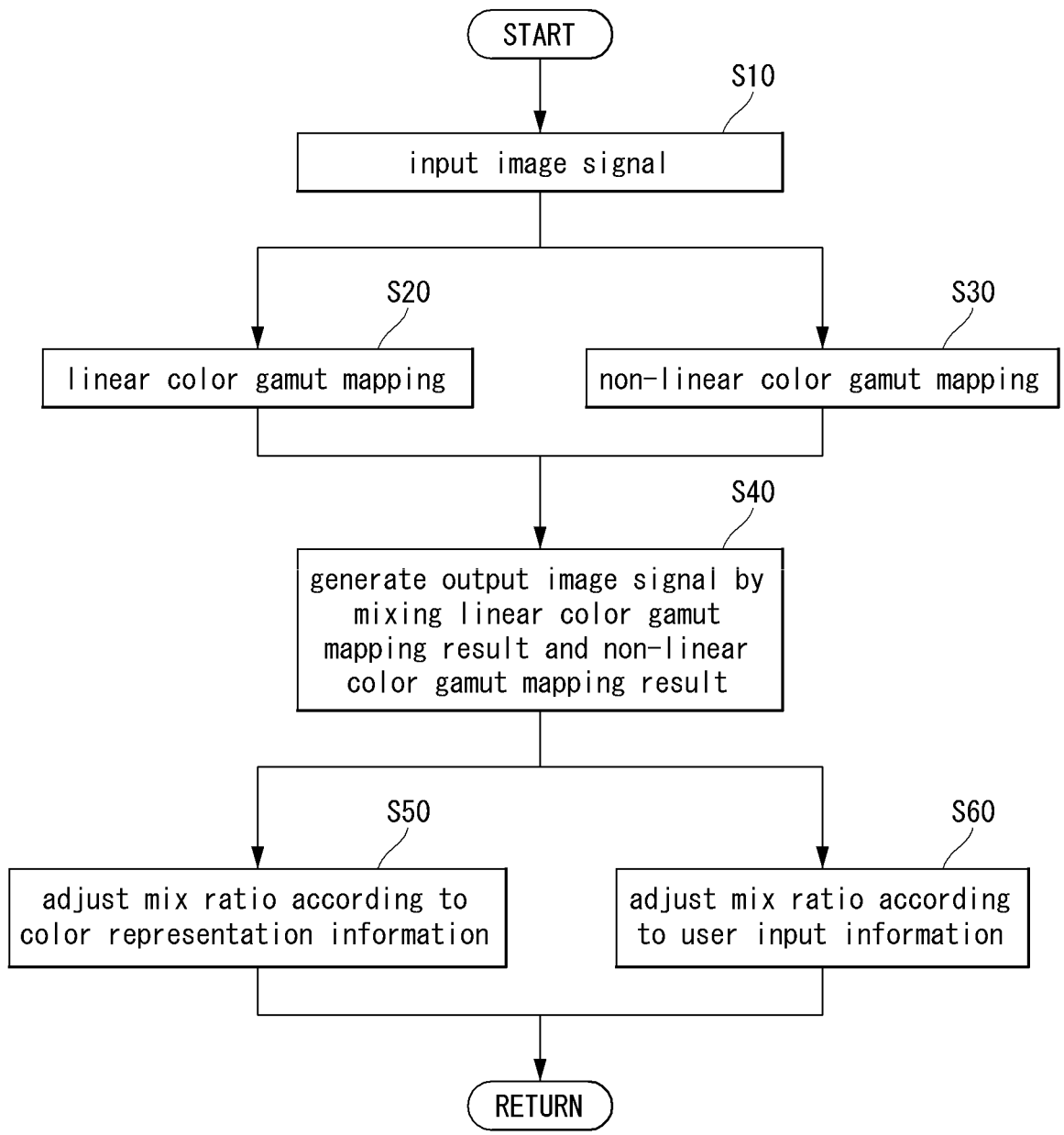

[Figure 3]
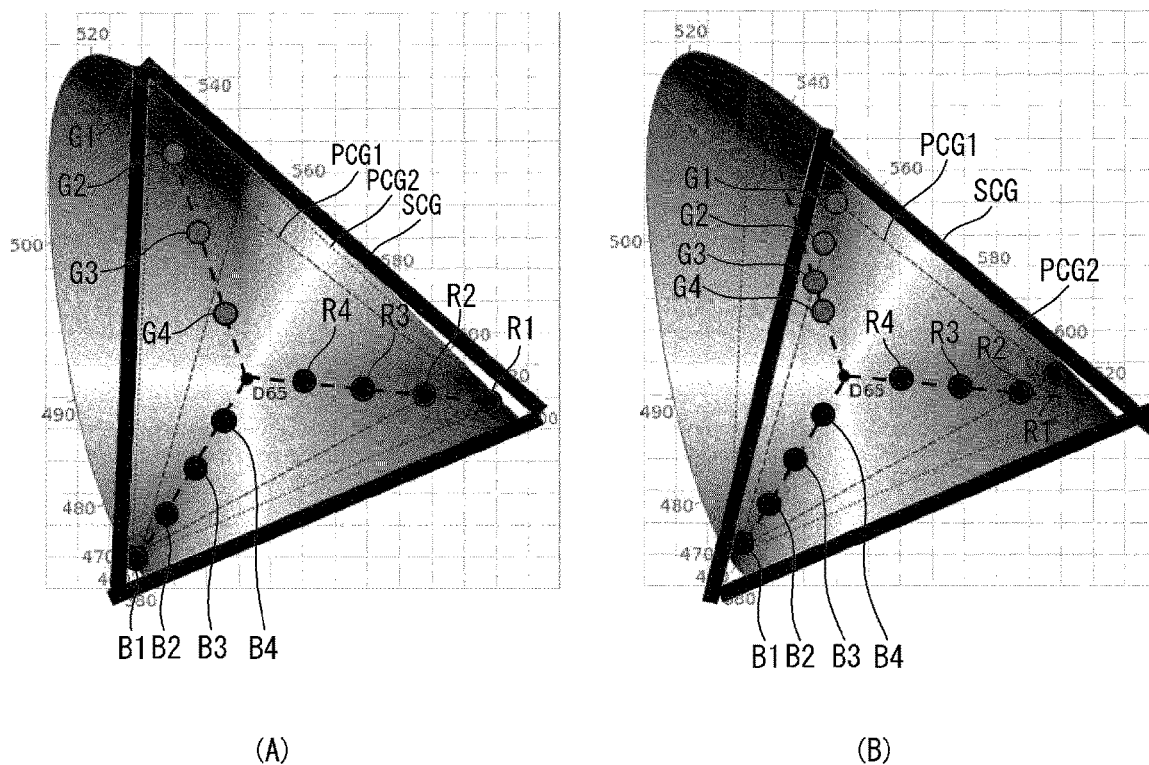
(A)    (B)
[Figure 4]
$$\begin{pmatrix} X_1' & Y_1' & Z_1' \\ X_2' & Y_2' & Z_2' \\ X_3' & Y_3' & Z_3' \end{pmatrix} = \begin{pmatrix} a_1 & b_1 & c_1 \\ a_2 & b_2 & c_2 \\ a_3 & b_3 & c_2 \end{pmatrix} \cdot \begin{pmatrix} X_1 & Y_1 & Z_1 \\ X_2 & Y_2 & Z_2 \\ X_3 & Y_3 & Z_3 \end{pmatrix}$$

【Figure 5】
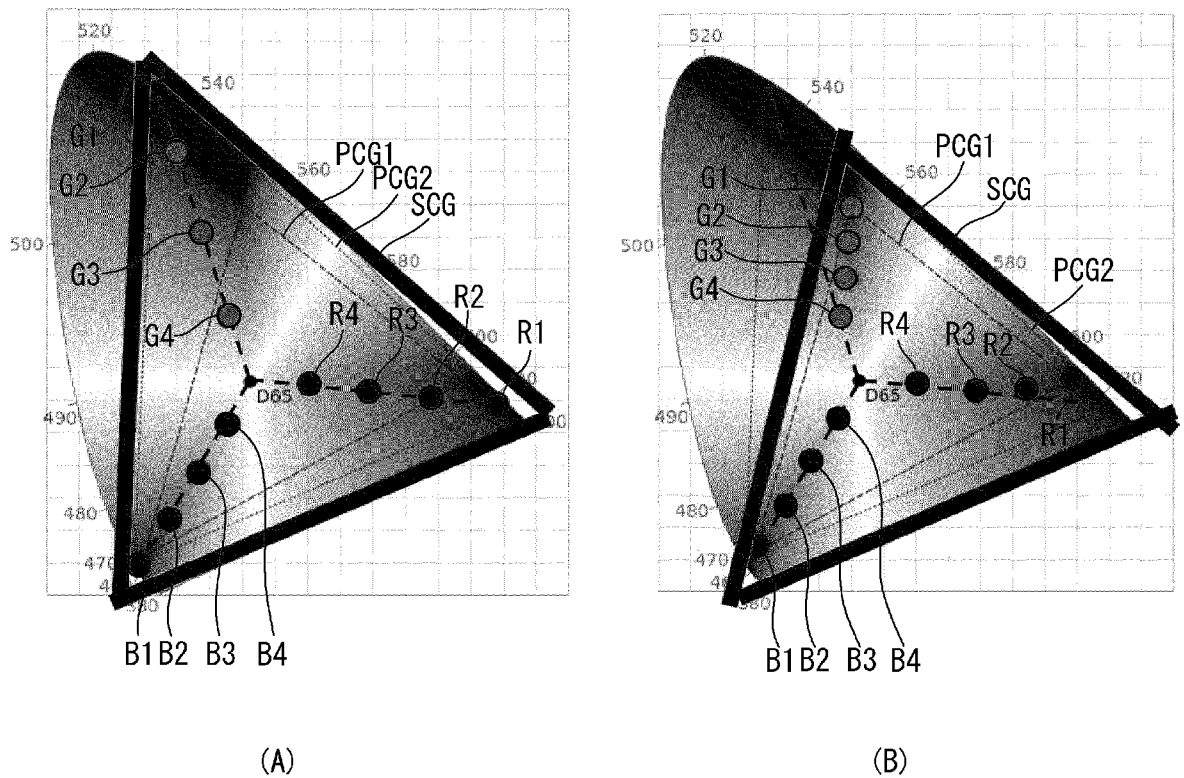
(A)                                (B)
【Figure 6】
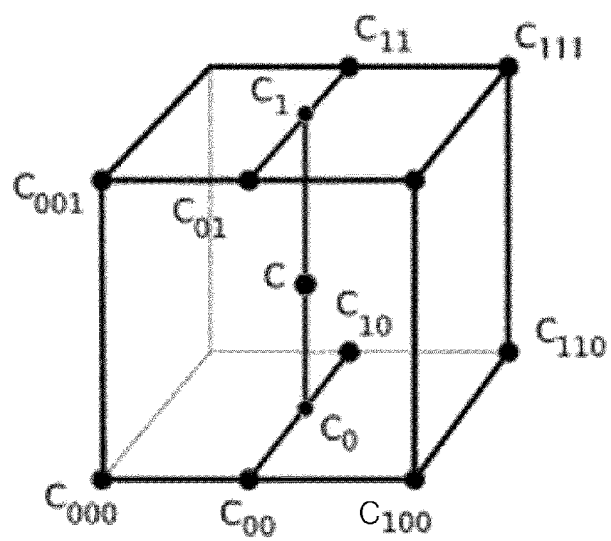

[Figure 7]
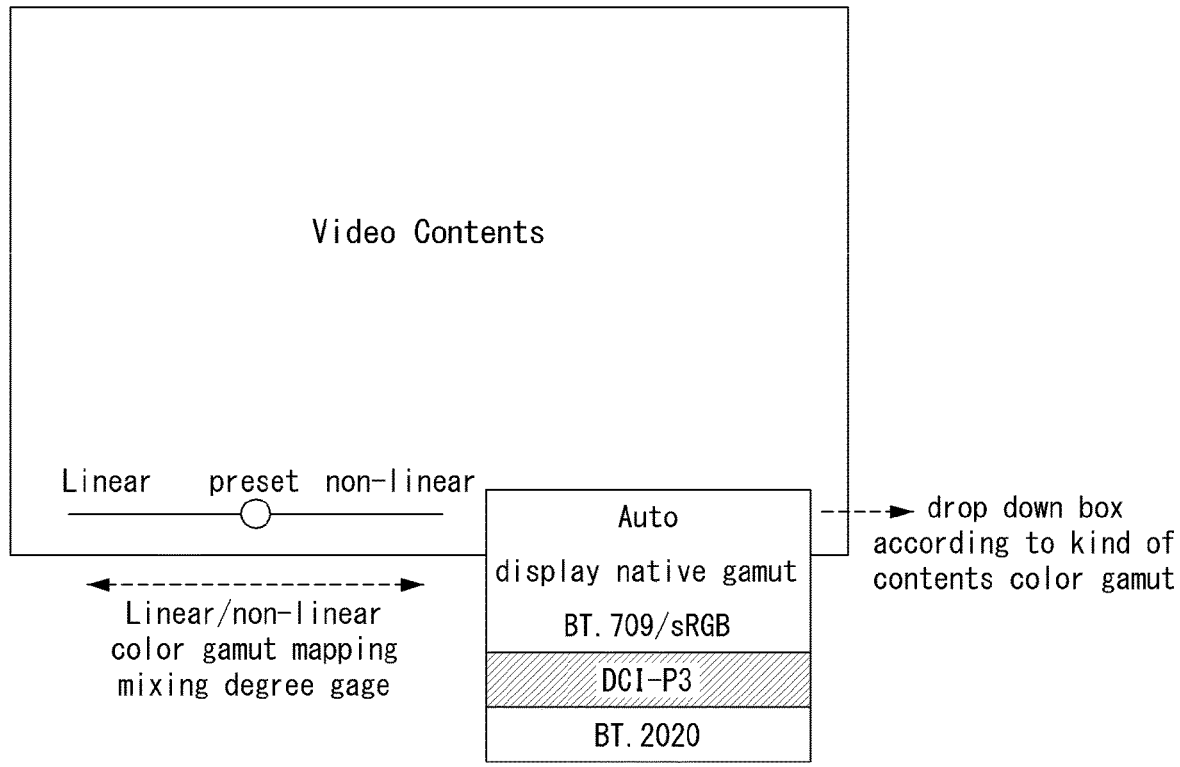
[Figure 8]
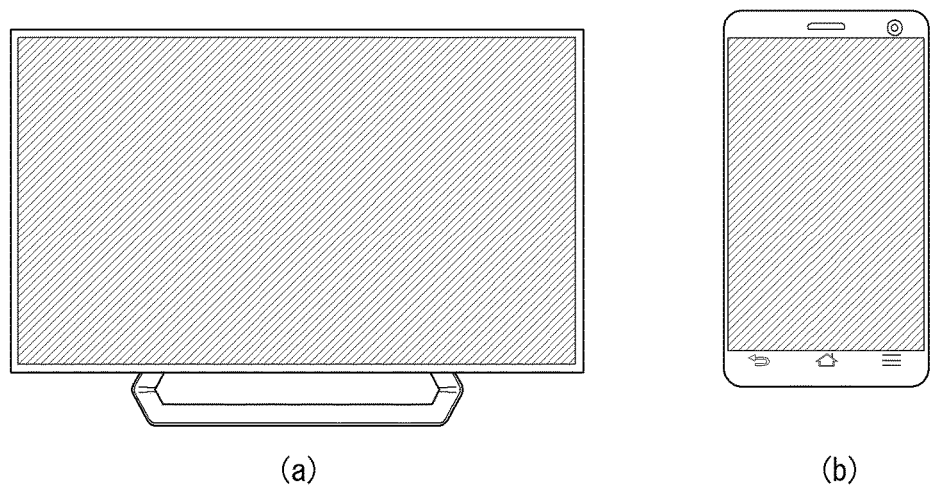
(a)            (b)

[Figure 9]
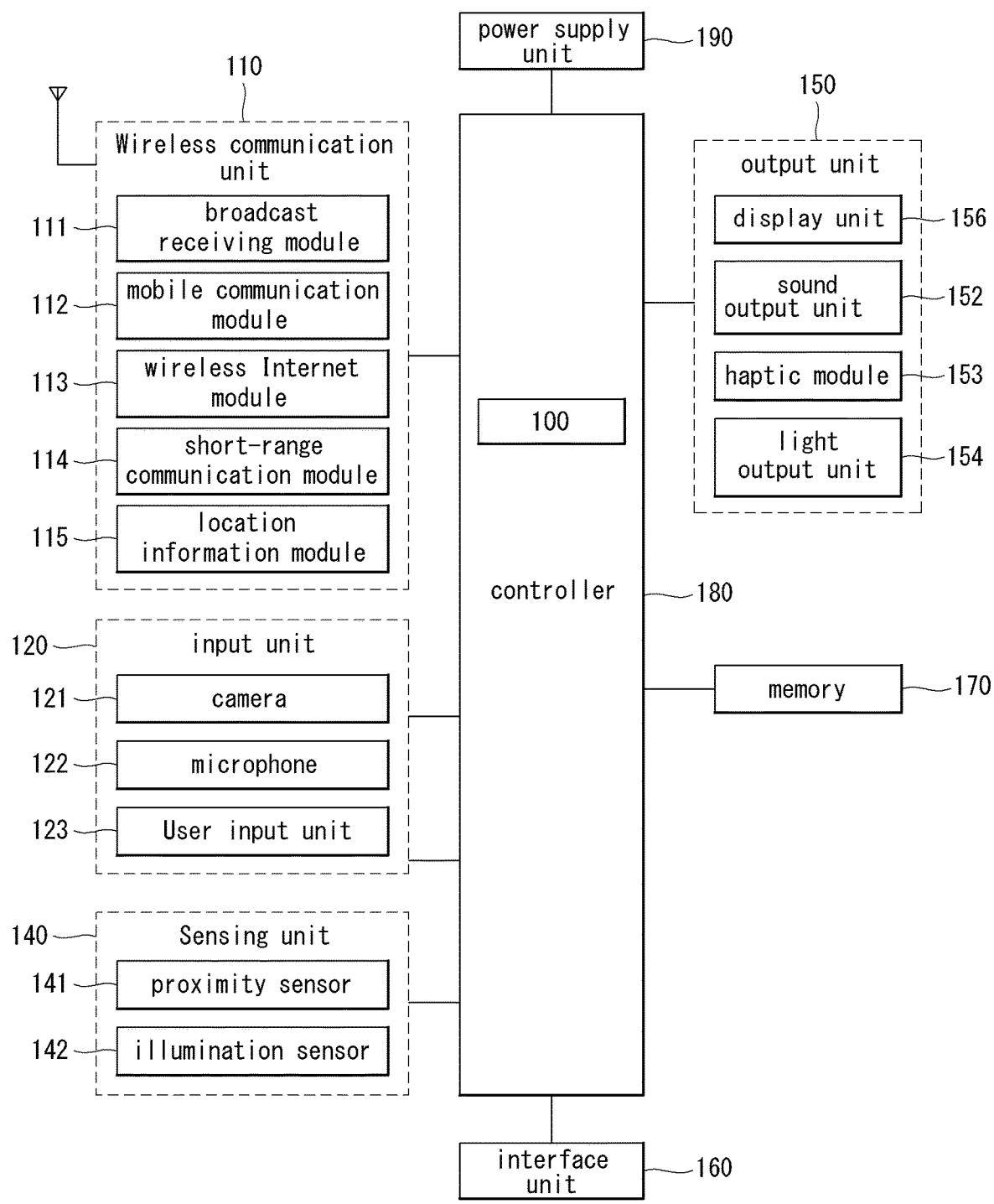

[Figure 10]
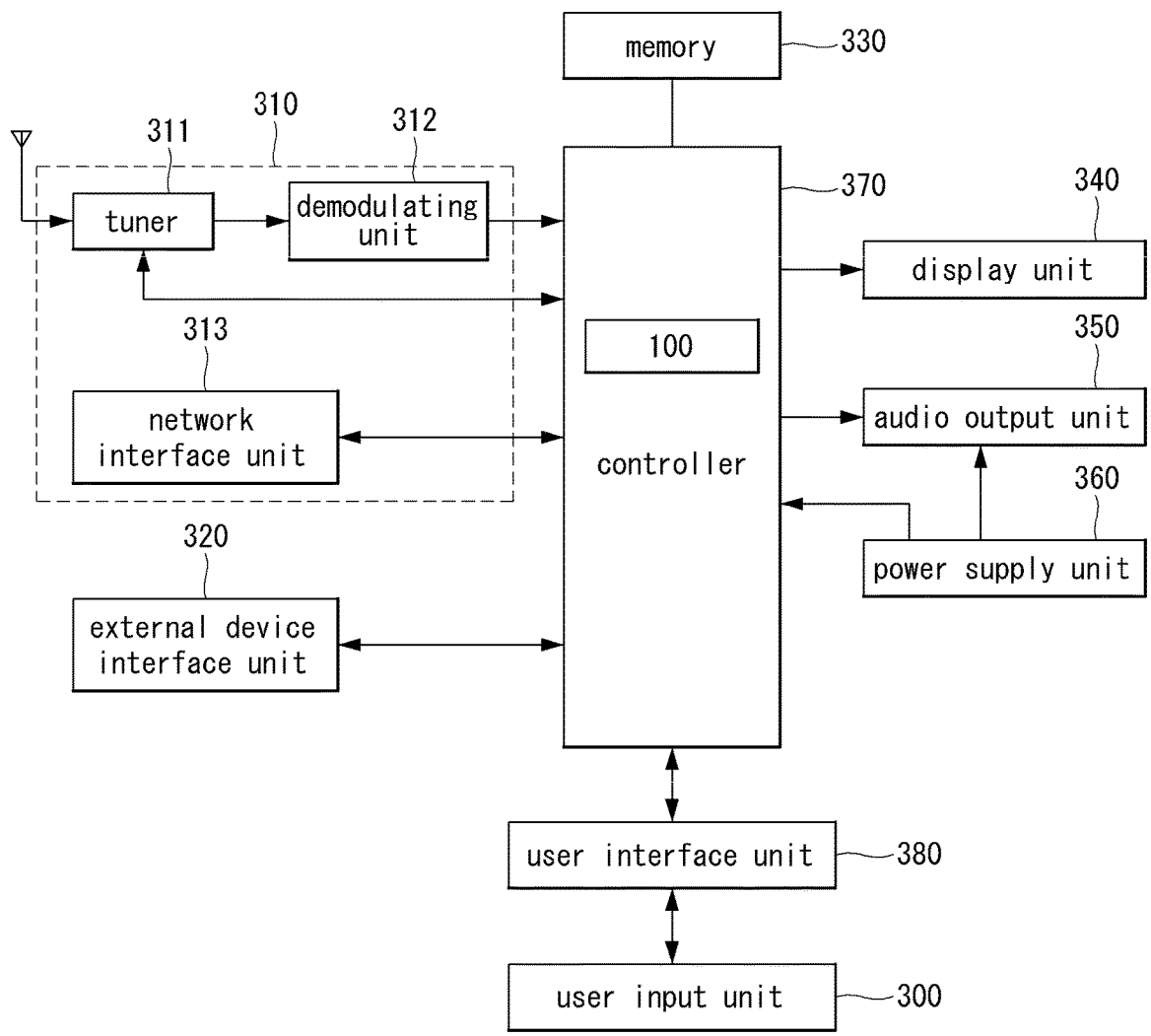

[Figure 11]
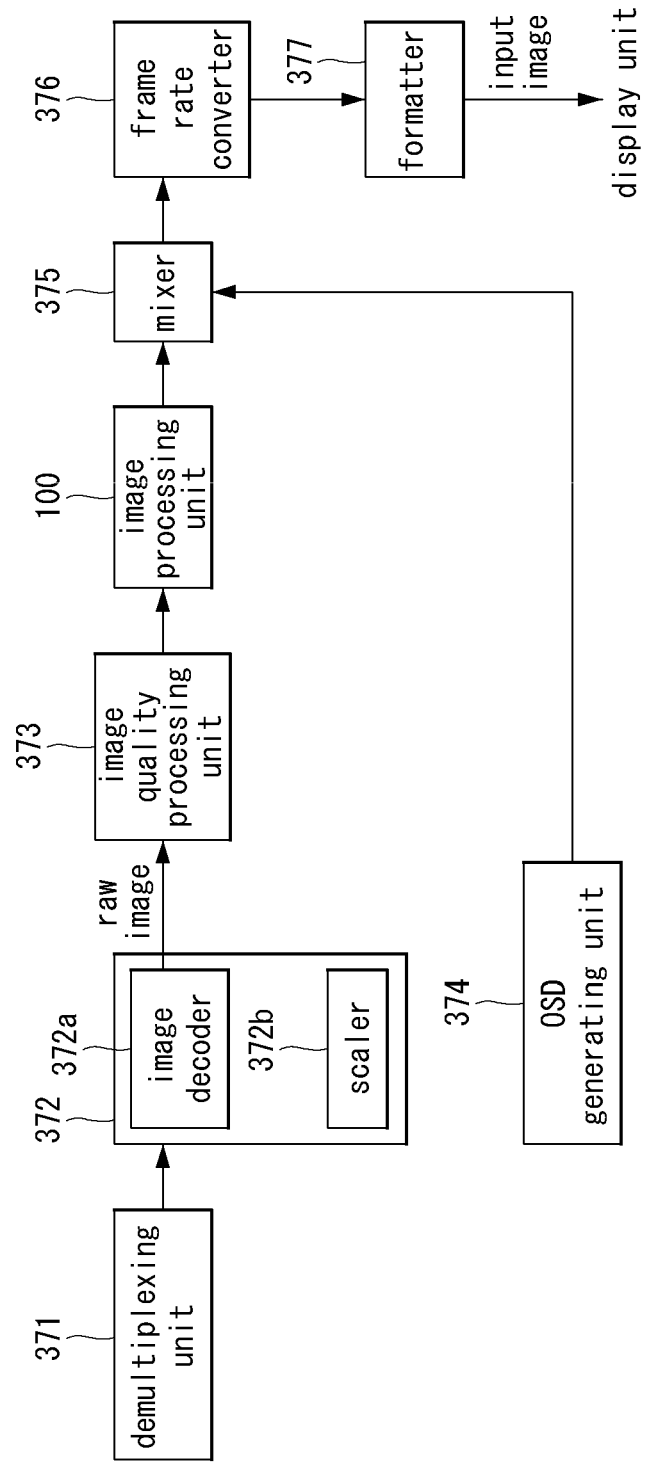

DISPLAY DEVICE AND IMAGE PROCESSING METHOD THEREOF

CROSS REFERENCE TO RELATED APPLICATIONS

This application is the National Phase of PCT International Application No. PCT/KR2018/002935, filed on Mar. 13, 2018, which claims priority under 35 U.S.C. 119(a) to Patent Application No. 10-2018-0027437, filed in the Republic of Korea on Mar. 8, 2018, all of these applications are hereby expressly incorporated by reference into the present application.

TECHNICAL FIELD

The disclosure concerns a display device that maps a color to an image desired by a device provider or user and an image processing method thereof.

BACKGROUND ART

In line with the increasing demand for high-quality video services, wide color gamut images have recently been proposed in the display industry.

Wide color gamut technology starts from producing images to express richer colors by using a much wider color space than before. The color space is called a color gamut, and a wide gamut image is generated through a high-end camera with a wide color gamut.

Legacy images with a common color gamut are expressed with up to the BT.709 color gamut of the broadcasting standards. A standard for representing a wider color space, up to the BT.2020 color gamut has recently been defined for recent wide color gamut technology.

DETAILED DESCRIPTION OF THE DISCLOSURE

Technical Problem

Wide color gamut technology has different image characteristics from those of the conventional common color gamut and, thus, to express the same, changes need to be made to the entire hardware system, including image format, relevant metadata, compression scheme, inter-equipment interface, and light color gamut supporting panel. In particular, if the input image has a different color gamut than that of the display, the color gamut of the image needs to be mapped to the color gamut of the display.

Therefore, an object of the disclosure is to provide a display device capable of obtaining correct color gamut mapping results without undermining the original intent upon playing legacy common color gamut images or wide color gamut images on a display device supporting wide color gamut technology and an image processing method thereof.

Technical Solution

According to an embodiment of the disclosure, a display device comprises a linear color gamut mapping unit deriving a linear color gamut mapping result for matching a color gamut of an input image signal to a target display color gamut, a non-linear color gamut mapping unit deriving a non-linear color gamut mapping result for matching the color gamut of the input image signal to the target display color gamut, and a mixing unit generating an output image signal by mixing the linear color gamut mapping result and the non-linear color gamut mapping result.

According to an embodiment of the disclosure, a method for processing an image by a display device comprises deriving a linear color gamut mapping result for matching a color gamut of an input image signal to a target display color gamut, deriving a non-linear color gamut mapping result for matching the color gamut of the input image signal to the target display color gamut, and generating an output image signal by mixing the linear color gamut mapping result and the non-linear color gamut mapping result.

Advantageous Effects

The disclosure may adjust a mix ratio of the linear color gamut mapping result to the non-linear color gamut mapping result according to the results of analysis of, e.g., meta data, brightness, saturation, or color of an input image signal. Thus, the disclosure may mitigate achromatic color tinting by increasing the relative mixing proportion of the linear color gamut mapping result as the input image signal is closer to an achromatic color and color saturation or color distortion in high-saturation or high-brightness colors by increasing the relative mixing proportion of the non-linear color gamut mapping result as the input image signal is closer to a chromatic color.

Further, the disclosure may further adjust the mix ratio of the linear color gamut mapping result to the non-linear color gamut mapping result according to the results of analysis of, e.g., user scroll information for adjusting the mix ratio and user selection information for selecting a color gamut different from the target display color gamut. Thus, the disclosure may provide the optimal color gamut mapping result intended by the user and original creator.

The applicability and additional scope of the disclosure will be apparent from the following detailed description. However, it will be readily appreciated by one of ordinary skill in the art that various changes and modifications may be made thereto without departing from the spirit and scope of the disclosure and, thus, the detailed description and specific embodiments of the disclosure, such as the preferred embodiments, should be understood as provided solely for illustration purposes.

BRIEF DESCRIPTION OF DRAWINGS

FIG. 1 is a view illustrating an image processing unit included in a display device according to an embodiment of the disclosure;

FIG. 2 is a view illustrating an image processing method of a display device according to an embodiment of the disclosure;

FIG. 3 is a view illustrating an example result of linear color gamut mapping;

FIG. 4 is a view illustrating an example M*M determinant used upon linear color gamut mapping;

FIG. 5 is a view illustrating an example non-linear color gamut mapping result;

FIG. 6 is a view illustrating a computation method according to a three-dimension (3D) lookup table used upon non-linear color gamut mapping;

FIG. 7 is a view illustrating an example of user input information used to adjust a mix ratio of a linear color gamut mapping result to a non-linear color gamut mapping result;

FIG. 8 is a view illustrating various examples of a display device;

FIG. 9 is a block diagram schematically illustrating an example mobile terminal; and FIGS. 10 and 11 are block diagrams illustrating an example stationary display device.

MODE FOR CARRYING OUT THE DISCLOSURE

Hereinafter, embodiments of the disclosure are described in detail with reference to the accompanying drawings. The same references may be used to denote the same or similar elements throughout the drawings and the specification, and no duplicate description is given of the elements. As used herein, the terms "module" and "unit" are provided solely for ease of description and these terms may be used interchangeably but rather than being distinct in meaning or role. When determined to make the subject matter of the disclosure unclear, the detailed description of the known art or functions may be skipped. The accompanying drawings are provided merely for a better understanding of the disclosure and the technical spirit or the scope of the disclosure are not limited by the drawings.

The terms coming with ordinal numbers such as 'first' and 'second' may be used to denote various components, but the components are not limited by the terms. The terms are used to distinguish one component from another.

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when a component is "directly connected to" or "directly coupled to" another component, no other intervening components may intervene therebetween.

As used herein, the singular forms "a," "an," and "the" are intended to include the plural forms as well, unless the context clearly indicates otherwise.

It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

As described herein, the display device may be implemented as a display device for TVs, smart TVs, network TVs, hybrid broadcast broadband televisions (HBBTVs), Internet TVs, web TVs, Internet protocol televisions, digital signage, desktop computers, mobile phones, smartphones, laptop computers, digital broadcasting terminals, personal digital assistants (PDAs), portable multimedia players (PMPs), navigation, slate PCs, tablet PCs, ultra-books, or wearable devices. The wearable devices include smartwatches, smart glasses, and head mounted displays. The display device may be implemented as a PDP, an LCD, an OLED, a quantum dot (QD) display, or a QD LED display.

The display device of the disclosure includes an image processing unit that may map the color gamut of an input image signal to the color gamut of a target display and provide an image quality desired by the original creator, device provider, or user. Specific embodiments of the display device are described below, focusing on the image processing unit.

FIGS. 1 and 2 illustrate an image processing unit 100 and image processing operations thereof according to an embodiment of the disclosure. FIG. 3 illustrates an example linear color gamut mapping result, and FIG. 4 illustrates an example M*M determinant used upon linear color gamut mapping. FIG. 5 is a view illustrating an example non-linear color gamut mapping result. FIG. 6 is a view illustrating a computation method according to a three-dimension (3D) lookup table used upon non-linear color gamut mapping. FIG. 7 is a view illustrating an example of user input information used to adjust a mix ratio of a linear color gamut mapping result to a non-linear color gamut mapping result.

Referring to FIGS. 1 and 2, according to an embodiment of the disclosure, the image processing unit 100 may include a linear color gamut mapping unit 10, a non-linear color gamut mapping unit 20, an information analyzing unit 30, and a mixing unit 40.

The linear color gamut mapping unit 10 derives a linear color gamut mapping result RGB1 to match the color gamut of an input image signal RGBi to the color gamut of the target display (S10, S20). The linear color gamut mapping unit 10 may obtain a matrix coefficient based on the color representation information analysis result from the information analyzing unit 30 and derive the linear color gamut mapping result RGB1 using an M*M determinant (where M is a natural number) having the matrix coefficient.

Linear gamut mapping generally shows a good mapping result regardless of chromatic/achromatic colors, as shown in FIG. 3 but may exhibit problems, such as color saturation and color distortion of high saturation colors (cyan, green, etc.), while clipping the out-of-gamut colors of the input image signal RGBi, which fall out of the color gamut of the target display. FIG. 3, PCG1 denotes a first display color gamut, PCG2 a second display color gamut which is broader than PCG1, and SCG the color gamut of the input image signal RGBi. R1 to R4, G1 to G4, and B1 to B4 are the tristimulus points of the colors to be reproduced.

In the case where SCG is input in the same light color gamut as PCG2 as shown in FIG. 3(A), and the color gamut of the target display is selected as PCG1, since the color gamut of the input image signal is wider than the color gamut of the target display, a color gamut mapping process is needed to match the image signal with the display.

FIG. 3(B) shows an example of linear color gamut mapping result by the 3*3 determinant of FIG. 4. The tristimulus points R1, G1, G2, and G3 falling out of the color gamut PCG1 of the target display, of the color gamut SCG of the input image signal RGBi, are clipped upon color gamut mapping and are thus repositioned in the color space. The color space is not limited to the xy chromaticity coordinates as shown in FIG. 3 and may be uv chromaticity coordinates, CIELAB, CIELUV, or CIECAM.

As such, as the difference between the color gamut of the input image signal and the color gamut of the target display increases, the brightness/saturation/color may not remain the same before and after gamut mapping and may rather be saturated (distorted).

In the xy chromaticity coordinates of FIG. 3, since $x=X/(X+Y+Z)$, $y=Y/(X+Y+Z)$, $z=Z/(X+Y+Z)$, and there is such a restriction condition as $x+y+z=1$, the color may be marked only with x and y but without z. Here, x and y are coordinates in the gamut. The XYZ (tristimulus values) of each point formed of a combination of the three primary colors in the xy chromaticity coordinates may be represented as shown in FIG. 4. In FIG. 4, X'Y'Z' denote the tristimulus values of the target display, abc denotes the matrix coefficient, and XYZ denote the tristimulus values of the input image signal. If the abc matrix coefficient is applied as shown in FIG. 4, the input xy coordinates may be mapped to the target xy coordinates.

In this case, the color gamut transformation matrix value may be obtained by performing an inverse matrix operation using the already known color gamut information of the input image signal (three primary color coordinates) and the target display's color gamut information (three primary color coordinates). In the case where the color gamut of the input image signal is wider than the color gamut of the target display, the matrix coefficient is shown as larger than 1 and, thus, a saturation occurs. In the opposite case, the matrix coefficient is shown as smaller than 1, and no saturation occurs.

The non-linear color gamut mapping unit 20 derives a non-linear color gamut mapping result RGB2 to match the color gamut of an input image signal RGBi to the color gamut of the target display (S10, S30). The non-linear color gamut mapping unit 20 may update the color gamut mapping information of the three-dimension (3D) lookup table based on the color representation information analysis results from the information analyzing unit 30 and derive the non-linear color gamut mapping result RGB2 using the 3D lookup table.

There are various non-linear color gamut mapping methods (algorithms). Basically, non-linear color gamut mapping is to determine the position in which the out-of-gamut colors are to be mapped in the target display color gamut using the xy/uv chromaticity coordinates or color properties, such as brightness/saturation/color in a specific color space and may incidentally include color space conversions (YCbCr, RGB, XYZ, CIELAB, CIELUV, CIECAM) with desired properties.

There are various approaches as to which of a range of colors that may be expressed in the target display gamut are expressed up to in their own positions, and what standard is to be applied to perform non-linear scaling down on the out-of-gamut colors. As an example, there are a way to reduce the saturation based on the same brightness, with the color remaining unchanged and a way to change the brightness and saturation simultaneously so that the degree of changes is constant. Information, such as brightness/saturation/color, needed for so doing, the color gamut information (e.g., the color coordinates of the three primary colors) of the input image signal, or the color gamut information (e.g., the color coordinates of the three primary colors) of the target display may be obtained through the color representation information analysis results from the information analyzing unit 30.

Given lots of computation and the possibility of mass production, the non-linear color gamut mapping method (algorithm) may be designed as a 3D lookup table. If the result of applying the algorithm to one pixel data item of the input image is stored in the 3D lookup table, the result of application of the algorithm may be obtained per pixel data item of the input image signal RGBi.

However, the computation method using the 3D lookup table may mainly use tri-linear interpolation and may be created in hardware with a resolution ranging from about 9*9*9 to about 33*33*33. In some cases, the computation method using the 3D lookup table may be created in hardware with a resolution of 65*65*65. Since the input image signal RGBi is divided into 9 steps, 33 steps, and 65 steps, the result of creation in hardware may cause achromatic color tinting as compared with the result of use of the full resolution using, e.g., a floating point.

As such, non-linear color gamut mapping does not perform clipping on the out-of-gamut colors and are thus freed from color saturation or color distortion, but the interpolation issue with the 3D lookup table may cause a tint in the achromatic colors.

FIG. 5 shows an example non-linear color gamut mapping result. FIG. 5, PCG1 denotes a first display color gamut, PCG2 a second display color gamut which is broader than PCG1, and SCG the color gamut of the input image signal RGBi. R1 to R4, G1 to G4, and B1 to B4 are the tristimulus points of the colors to be reproduced.

In the case where SCG is input in the same light color gamut as PCG2 as shown in FIG. 5(A), and the color gamut of the target display is selected as PCG1, since the color gamut of the input image signal is wider than the color gamut of the target display, a color gamut mapping process is needed to match the image signal with the display.

FIG. 5(B) shows an example of non-linear color gamut mapping result by the trilinear interpolation of FIG. 6. The tristimulus points R1, G1, G2, and G3 falling out of the color gamut PCG1 of the target display, of the color gamut SCG of the input image signal RGBi, are interpolated upon color gamut mapping and are thus repositioned in the color space. The color space is not limited to the xy chromaticity coordinates as shown in FIG. 5 and may be uv chromaticity coordinates, CIELAB, CIELUV, or CIECAM.

The trilinear interpolation is a method of calculating the value of target point C using eight surrounding points as shown in FIG. 6 and, because of using only linear calculation, this method may cause a difference from the originally intended value if the resolution is insufficient.

The information analyzing unit 30 and the mixing unit 40 supplements the above-described linear color gamut mapping and non-linear color gamut mapping.

The information analyzing unit 30 analyzes the color representation information included in the input image signal. Here, the color representation information may include meta data, brightness, saturation, and color for the input image signal RGBi.

The information analyzing unit 30, if there is a user input for adjusting the mix ratio of linear mapping to non-linear mapping, may adjust the mix ratio by analyzing the user input information. Here, the user input information may include user scroll information for adjusting the mix ratio and user selection information for selecting a color gamut different from the target display color gamut.

The result of analysis of the user input information and the result of analysis of the color representation information output from the information analyzing unit 30 are input to the mixing unit 40. The mixing unit 40 mixes the linear color gamut mapping result RGB1 input from the linear color gamut mapping unit 10 and the non-linear color gamut mapping result RGB2 input from the non-linear color gamut mapping unit 20, thereby generating an output image signal RGBo (S40).

The mixing unit 40 may generate the output image signal RGBo according to RGBo=α*RGB1+(1−α)*RGB2. Here, RGBo denotes pixel data corresponding to the output image signal, RGB1 denotes pixel data corresponding to the linear color gamut mapping result, RGB2 denotes pixel data corresponding to the non-linear color gamut mapping result, and α denotes the mixing ratio.

The mixing unit 40 may determine, e.g., the meta data, brightness, saturation, or color of the input image signal RGBi according to the result of analysis of the color representation information and, accordingly, adjust the mix ratio of the linear color gamut mapping result RGB1 and the non-linear color gamut mapping result RGB2. The mixing unit 40 may determine the saturation of the input image signal RGBi by various methods according to the kind of the color space (CIELAB/CIELUV/CIECAM/HSV, etc.). As an example, in an HSV color space, a definition of the saturation according to RGB-to-HSV conversion is (max(RGB)−min(RGB))/max(RGB). The saturation may be obtained using each pixel data item of the input image signal RGBi, and the height of the saturation may be determined depending on the size.

As the input image signal RGBi becomes closer to an achromatic color, the mixing unit 40 may increase the relative mix ratio proportion of the linear color gamut mapping result RGB1, thereby mitigating achromatic color tinting (S50).

As the input image signal RGBi becomes closer to a chromatic color, the mixing unit 40 may increase the relative proportion of the non-linear color gamut mapping result RGB2, thereby mitigating color saturation or color distortion in high-saturation, or high-brightness color (S60).

Meanwhile, the mixing unit 40 may further adjust the mix ratio of the linear color gamut mapping result RGB1 to the non-linear color gamut mapping result RGB2 according to the result of analysis of the user input information. The mixing unit 40 may adjust the mix ratio according to the color representation information and may then readjust the mix ratio according to the user input information, thereby producing the optimal color gamut mapping result desired by the user.

An example of the user input information is shown in FIG. 7. In FIG. 7, the mix setting degree gauge may be user scroll information for adjusting the mix ratio. The drop down box may be user selection information for selecting a color gamut different from the target display color gamut. The mix ratio may be automatically set to a level intended by the original creator via interpretation of the meta data and be adjusted to a level desired by the user according to the user input information.

The mixing unit 40 may use, as default, automatic color gamut mapping to the target display color gamut based on the color gamut of the input image signal RGBi analyzed from the meta data information and select various color gamuts according to the user input information. The basic operation of color gamut mapping is to allow the original creator's intent to be reproduced based on the display color gamut information, which is already known, and the meta data included in the image. However, the reason why the desired color gamut is allowed to be selected manually is to respond to the case where the meta data is not included due to an error in the image or player or the meta data has been wrong written, or the case where the user desires to map to a color gamut different from the target display color gamut.

FIG. 8 is a view illustrating various examples of a display device.

The display device of the disclosure may be applicable to various display devices, such as the stationary display device A or mobile terminal display device B as shown in FIG. 8. Representative examples of the stationary display device A are TV or computer monitors. The mobile terminals may be cellular phones, smartphones, or wearable devices. The display device of the disclosure may include the above-described image processing unit 100 and a display unit. The image processing unit 100 may be placed in the controller of FIGS. 9 to 11.

FIG. 9 is a block diagram schematically illustrating an example mobile terminal.

Referring to FIG. 9, a mobile terminal may include a wireless communication unit 110, an input unit 120, a sensing unit 140, an output unit 150, an interface unit 160, a memory 170, a controller 180, and a power supply unit 190. The components shown in FIG. 9 are not necessary to implement the mobile terminal, and the mobile terminal described herein may have more or less components that those enumerated above.

The wireless communication unit 110 may include one or more modules to enable wireless communication between the mobile terminal and a wireless communication system, between the mobile terminal and another mobile terminal, or between the mobile terminal and an external server. Further, the wireless communication unit 110 may include one or more modules to connect the mobile terminal to one or more networks.

The wireless communication unit 110 may include at least one of a broadcast receiving module 111, a mobile communication module 112, a wireless Internet module 113, a short-range communication module 114, and a location information module 115.

The input unit 120 may include a camera 121 or image input unit for inputting image signals, a microphone 122 or audio input unit for inputting audio signals, and a user input unit 123 (e.g., touch keys or mechanical keys) for receiving information from the user. The sound data or image data gathered by the input unit 120 may be analyzed and be processed by the user's control command.

The sensing unit 140 may include one or more sensors for sensing at least one of information in the mobile terminal, ambient environment information about the surroundings of the mobile terminal, and user information. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (e.g., a camera (refer to 121)), a microphone (refer to 122), a battery gauge, an environment sensor (e.g., a barometer, hygrometer, thermometer, radiation detection sensor, heat detection sensor, or gas detection sensor), or a chemical sensor (e.g., an electronic nose, healthcare sensor, or biometric sensor). The mobile terminal may use a combination of pieces of information sensed by at least two or more sensors among the sensors.

The output unit 150 generates an output related to visual, auditory or tactile sense, and may include at least one of a sound output unit 152, a haptic module 153, a light output unit 154, and a display unit 156. The display unit 156 may be layered or integrated with a touch sensor, implementing a touchscreen. The touchscreen may function as the user input unit 123 to provide an input interface between the mobile terminal and the user, as well as an output interface between the user and the mobile terminal.

The interface unit 160 plays a role as a pathway with various kinds of external devices connected to the mobile terminal. The interface unit 160 may include at least one of wired/wireless headset ports, external charger ports, wired/wireless data ports, memory card ports, ports for connecting identification module-equipped devices, audio input/output (I/O) ports, video I/O ports, and earphone ports. The mobile terminal may perform proper control related to an external device in response to connection of the external device to the interface unit 160.

The memory 170 stores data for supporting various functions of the mobile terminal. The memory 170 may store multiple application programs (or applications) driven on the mobile terminal and data and commands for operating the mobile terminal. At least some of the application programs may be downloaded from an external server via wireless communication. Further, among the application programs, at least some may exist on the mobile terminal when shipped out for being able to perform basic functions of the mobile terminal (e.g., sending and receiving calls or messages). The application programs may be stored in the memory 170 and be installed on the mobile terminal to be driven by the controller 180 to perform the operations (or functions) of the mobile terminal.

The controller 180 controls the overall operation of the mobile terminal. The controller 180 may process, e.g., signals, data, or information input or output via the above-described components or drive the application programs stored in the memory 170, thereby providing or processing information or functions suitable for the user. Further, the controller 180 may control at least some of the components described above in connection with FIG. 2 to drive the application programs stored in the memory 170. The controller 180 may combine and operate at least two or more of the components included in the mobile terminal to drive the application programs. The above-described image processing unit 100 may be placed in the controller 180.

The power supply unit 190 may receive external power or internal power and supply power to each component in the mobile terminal under the control of the controller 180. The power supply unit 190 may include a battery which may be an embedded battery or replaceable battery.

At least some of the components may interwork with one another to implement the operations, control, or control methods of the mobile terminal according to various embodiments, described below. The operations, control, or control methods of the mobile terminal may be implemented on the mobile terminal by driving at least one application program stored in the memory 170.

Prior to description of various embodiments implemented via the above-described mobile terminal, the above-enumerated components are described below in greater detail.

The broadcast receiving module 111 of the wireless communication unit 110 receives broadcast signals and/or broadcast-related signals from an external broadcast management server via a broadcast channel. The broadcast channel may include a satellite channel or a terrestrial channel. For simultaneous reception via at least two broadcast channels or switching between broadcast channels, two or more broadcast receiving modules may be provided in the mobile terminal. The broadcast management server may mean a server that generates and transmits broadcast signals and/or broadcast-related information or a server that receives pre-generated broadcast signals and/or broadcast-related information and transmits the same to the terminal. The broadcast signals may include not only TV broadcast signals, radio broadcast signals, data broadcast signals, but also combined signals of TV broadcast signals or radio broadcast signals and data broadcast signals. The broadcast signals may be encoded by at least one of technical standards (or broadcast schemes, e.g., ISO, IEC, DVB, or ATSC) for transmission/reception of digital broadcast signals. The broadcast receiving module 111 may receive digital broadcast signals using a scheme appropriate for technical specification defined in the technical standards. The broadcast-related information may mean information related to the broadcast channel, broadcast program, or broadcast service provider. The broadcast-related information may be provided via a mobile communication network as well. In such a case, the broadcast-related information may be received by the mobile communication module 112.

The broadcast-related information may exist in various forms, such as, e.g., DMB (Digital Multimedia Broadcasting) EPG (Electronic Program Guide) or DVB-H (Digital Video Broadcast-Handheld) ESG (Electronic Service Guide). The broadcast signals and/or broadcast-related information received via the broadcast receiving module 111 may be stored in the memory 170.

The mobile communication module 112 transmits or receives wireless signals to/from at least one of a base station, an external terminal, or a server over a mobile communication network established as per mobile communication standards, protocols, or schemes, such as global system for mobile communication (GSM), code division multiple access (CDMA), CDMA2000, enhanced voice-data optimized or enhanced voice-data only (EV-DO), wideband CDMA (WCDMA), high speed downlink packet access (HSDPA), high speed uplink packet access (HSUPA), long term evolution (LTE), or LTE-advanced (LTE-A). The wireless signals may include voice call signals, video call signals, or other various types of data according to transmission/reception of text/multimedia messages.

The wireless Internet module 113 is a module for wireless Internet access. The wireless Internet module 113 may be embedded in or provided outside the mobile terminal. The wireless Internet module 113 is configured to transmit and receive wireless signals over a communication network according to wireless Internet technology. The wireless Internet technology includes, e.g., WLAN (Wireless LAN), Wi-Fi (Wireless-Fidelity), Wi-Fi (Wireless Fidelity), DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), LTE-A (Long Term Evolution-Advanced), or 5G. Data is transmitted and received according to at least one wireless Internet technology in the scope encompassing Internet technologies even not enumerated above. In light that wireless Internet access by WiBro, HSDPA, HSUPA, GSM, CDMA, WCDMA, LTE, and LTE-A is achieved via a mobile communication network, the wireless Internet module 113 performing wireless Internet access via a mobile communication network may be appreciated as a kind of mobile communication module 112.

The short-range communication module 114 may be intended for short-range communication and may support short-range communication using at least one of Bluetooth™, radio frequency identification (RFID), infrared data association (IrDA), ultra-wideband (UWB), ZigBee, near-field communication (NFC), wireless-fidelity (Wi-Fi), Wi-Fi Direct, or wireless universal serial bus (USB) technology.

The short-range communication module 114 may support wireless communication between the mobile terminal and a wireless communication system, between the mobile terminal and another mobile terminal, or between the mobile terminal and a network where the other mobile terminal (or an external server) is located, via a short-range wireless communication network. The short-range wireless communication network may be a short-range wireless personal communication network. Here, the other mobile terminal may be a wearable device (e.g., a smartwatch, smart glasses, or head mounted display (HMD)) that may interchange data (or interwork) with the mobile terminal of the disclosure. The short-range communication module 114 may detect (or recognize) wearable devices capable of communicating with the mobile terminal, around the mobile terminal. Further, if the detected wearable device is a device authenticated to communicate with the mobile terminal of the disclosure, the controller 180 may transmit at least part of the data processed by the mobile terminal to the wearable device via the short-range communication module 114. Thus, the user of the wearable device may use the data processed by the mobile terminal, on the wearable device. For example, if a call is received by the mobile terminal, the user may talk on the wearable device or, if a message is received by the mobile terminal, the user may check the received message on the wearable device.

The location information module 115 is a module for obtaining the location (or current location) of the mobile terminal and representative examples thereof include global positioning system (GPS) modules or Wi-Fi (Wireless Fidelity) modules. For example, upon using a GPS module, the mobile terminal may obtain the location of the mobile terminal using signals received from the GPS satellite. As another example, upon using a Wi-Fi module, the mobile terminal may obtain the location of the mobile terminal based on information from wireless access points (APs) that transmit or receive wireless signals to/from the Wi-Fi module. As necessary, the location information module 115 may alternatively or additionally perform any function of another module of the wireless communication unit 110 to obtain data regarding the location of the mobile terminal. The location information module 115 is a module used to obtain the location (or current location) of the mobile terminal and is not limited to modules that directly calculate or obtain the location of the mobile terminal.

The input unit 120 may be intended for inputting information from the user or image information (or signal), audio information (or signal), or data, and the input unit 120 may include one or more cameras 121 to input image information. The camera 121 processes image frames, such as still images or videos, obtained by the image sensor in video call mode or recording mode. The processed image frames may be displayed on the display unit 156 or be stored in the memory 170. The plurality of cameras 121 provided in the mobile terminal may be arranged to form a matrix structure, and a plurality of pieces of image information with various angles or focuses may be input to the mobile terminal via the cameras 121 of the matrix structure. Further, the plurality of cameras 121 may be arranged in a stereo structure to obtain a left image and right image for implementing a stereoscopic image.

The microphone 122 processes external sound signals into electrical voice data. The processed voice data may be utilized in various manners according to the function performed by the mobile terminal (or a running application program). Various noise canceling algorithms may be implemented to remove noise generated while the microphone 122 receives external sound signals.

The user input unit 123 may be provided for receiving information from the user. When information is input through the user input unit 123, the controller 180 may control the operation of the mobile terminal corresponding to the input information. The user input unit 123 may include a mechanical input means (or mechanical keys, e.g., buttons, dome switches, a jog wheel, or jog switch positioned on the front/back or side surface of the mobile terminal) and a touch-type input means. As an example, the touch-type input means may be composed of virtual keys, soft keys, or visual keys displayed on the touchscreen via processing in software or touch keys arranged out of the touchscreen, and the virtual keys or visual keys may be displayed on the touch screen in various forms, and be composed of, e.g., graphics, text, icons, videos, or a combination thereof.

The sensing unit 140 may sense at least one of information in the mobile terminal, ambient environment information about the surroundings of the mobile terminal, and user information and generate a sensing signal corresponding thereto. The controller 180 may control the driving or operation of the mobile terminal or perform processing, functions, or operations related to the application program installed on the mobile terminal, based on the sensing signals. Representative sensors that may be included in the sensing unit 140 are described below in greater detail.

The proximity sensor 141 refers to a sensor that detects the presence or absence of an object approaching a predetermined detection surface or present nearby, without any physical contact, using, e.g., an electromagnetic force or infrared (IR) rays. The proximity sensor 141 may be positioned inside the mobile terminal surrounded by the touch screen or near the touch screen.

Examples of the touch proximity sensor 141 include transmissive photoelectric sensors, direct reflecting photoelectric sensors, mirror-reflecting photoelectric sensors, high-frequency oscillation proximity sensors, capacitive proximity sensors, magnetic proximity sensors, or infrared proximity sensors. In the case of a capacitive touch screen, the proximity sensor 141 may be configured to detect an approach of an object based on changes in electric field due to the approach of the object with conductivity. In such a case, the touch screen (or touch sensor) itself may be classified as a proximity sensor.

For ease of description, when the object is recognized as being positioned on the touch screen as it approaches but does not contact the touch screen, this action is referred to as "proximity touch" and, when the object actually contacts the touch screen, this action is referred to as "contact touch." The position where the object proximity-touches on the touch screen means a position vertically corresponding to the touch screen when the object proximity-touches. The proximity sensor 141 may detect proximity touches and proximity touch patterns (e.g., proximity touch distance, proximity touch direction, proximity touch speed, proximity touch time, proximity touch position, and proximity touch moving state). Meanwhile, the controller 180 may process data (or information) corresponding to the proximity touch operation and proximity touch pattern detected via the proximity sensor 141 and may output visual information corresponding to the processed data on the touch screen. Further, the controller 180 may control the mobile terminal so that different operations or data (or information) is processed depending on whether the touch to the same point on the touch screen is the proximity touch or contact touch.

The touch sensor detects the touch (or touch input) applied to the touch screen (or display unit 156) using at least one of a resistive scheme, a capacitive scheme, an IR scheme, an ultrasonic scheme, a magnetic scheme, or other various touch schemes. The touch sensor may be configured to convert the pressure applied to a specific portion of the touch screen or a variation in the capacitance occurring in the specific portion into an electrical input signal. The touch sensor may be configured to be able to detect, e.g., the position, area, pressure, or capacitance of the touch, to the touch sensor, of the touching object which touches the touch screen. Here, the touching object is a thing that applies touch to the touch sensor and may be, e.g., a finger, touch pen, stylus pen, or pointer.

Where there is a touch input to the touch sensor, a signal(s) corresponding thereto is sent to the touch controller. The touch controller processes the signal and transmits data corresponding thereto to the controller 180. Thus, the controller 180 may be aware what area has been touched in the display unit 156. The touch controller may be a component separate from the controller 180 or may be embedded in the controller 180.

The controller 180 may perform different types of control or the same type of control depending on the kind of the touching object which touches the touch screen (or a touch key provided except for the touch screen). Whether to perform the same or different types of control depending on the kind of the touching object may be determined according to the current operation state of the mobile terminal or the application program being executed.

The touch sensor and proximity sensor may sense various types of touches, such as short (or tap) touches, long touches, multi-touch, drag touches, flick touches, pinch-in touches, pinch-out touches, swipe touches, or hovering touches on the touch screen, alone or in combination.

The ultrasonic sensor may recognize the location information of the detection target using ultrasonic waves. The controller 180 may calculate the location of the wave source via information detected from a plurality of ultrasonic sensors and an optical sensor. The location of the wave source may be calculated using the characteristic that light is much faster than ultrasonic waves, i.e., the time taken for light to reach the optical sensor is much shorter than the time taken for an ultrasonic wave to reach the ultrasonic sensor. More specifically, the location of the wave source may be calculated using the difference in arrival time between light, as a reference signal, and ultrasonic wave.

The camera 121 includes at least one of a camera sensor (e.g., a CCD or CMOS), a photo sensor (or image sensor), and a laser sensor. The camera 121 and the laser sensor may be combined to detect a touch to the detection target for the 3D stereoscopic image. The photo sensor may be stacked on the display element. The photo sensor is configured to scan the movement of the detection target approaching the touch screen. More specifically, the photo sensor includes photo diodes and transistors (TRs) in the rows and columns thereof and scan the content placed thereon using the electrical signal which is varied depending on the amount of light applied to the photo diodes. In other words, the photo sensor performs coordinate calculation on the detection target according to variations in light and obtain the location information of the detection target based thereupon.

The display unit 156 displays (outputs) information processed by the mobile terminal. The display unit 156 may display execution screen information for the application program running on the mobile terminal or user interface (UI) or graphic user interface (GUI) according to the execution screen information. The above-described image processing unit 100 maps the color gamut of the input image signal received from the external image source to the color gamut of the target display and transmits the result to the display unit 156.

The display unit 156 may be configured as a stereoscopic display unit to display stereoscopic images. A stereoscopic type (glasses type), auto stereoscopic type (non-glasses type), projection type (holographic type), or other 3D display types may be applied to the stereoscopic display unit.

The 3D stereoscopic image is composed of a left image (image for the left eye) and a right image (image for the right eye). Depending on how the left image and right image are merged into the 3D stereoscopic image, the 3D display types are divided into the top-down type in which the left image and right image are placed one above the other in one frame, the left-to-right (L-to-R) (or side by side) type in which the left and right images are disposed left to right in one frame, the checker board type in which the fragments of the left and right images are arrayed like tiles, the interlaced type in which the left and right images are alternately arranged on a per-row or column basis, and the time sequential (frame by frame) type in which the left and right images are alternately displayed over time.

A left image thumbnail and a right image thumbnail may be created from the left image and the right image, respectively, of the raw image frame and may then merged into a single 3D thumbnail image. In general, thumbnail means a shrunken image or shrunken still image. The so-created left image thumbnail and right image thumbnail are displayed apart from each other at as long a left-to-right distance as the depth corresponding to the parallax between the left and right images, on the screen, thereby delivering a stereoscopic sense of space.

The left and right images necessary to implement the 3D stereoscopic image may be displayed on the stereoscopic display unit by the image processing unit. The image processing unit may be configured to receive a 3D image (the image at the reference view point and the image at the extended view point) and configure the left and right images from the 3D image, or the image processing unit may be configured to receive a 2D image and switch the 2D image into the left and right images.

The sound output unit 152 may output audio data stored in the memory 170 or received from the wireless communication unit 110 in, e.g., a call signal reception, call or recording mode, voice recognition mode, or broadcast reception mode. The sound output unit 152 may output sound signals related to the functions (e.g., call signal receiving sounds or message receiving sounds) performed on the mobile terminal. The sound output unit 152 may include, e.g., a receiver, a speaker, and a buzzer.

The haptic module 153 generates various tactile effects that may be felt by the user. A representative example of the haptic effects generated by the haptic module 153 may be a vibration. The strength and pattern of the vibration generated from the haptic module 153 may be controlled by the user's selection or settings of the controller. The haptic module 153 may synthesize and output different vibrations or may sequentially output different vibrations. The haptic module 153 may create other various tactile effects than vibration, e.g., a pin array moving perpendicular to the contacting skin surface, the force of the air jetted or sucked via a nozzle or suction hole, rubbing on the skin surface, contact of an electrode, electromagnetic stimulus, or reproduction of cold or hot feeling using an endothermic or exothermic element.

The haptic module 153 may be implemented to deliver a tactile effect via direct contact or to allow the user to feel tactile effects via, e.g., the muscular sense of her finger or arm. Two or more haptic modules 153 may be provided depending on the configuration of the mobile terminal.

The light output unit 154 outputs a signal for indicating an occurrence of an event using light from a light source of the mobile terminal. Examples of the event occurring in the mobile terminal may include receiving a message or a call signal, a missing call, an alarm, a schedule notification, receiving an email, or receiving information via an application.

The signal output from the light output unit 154 is implemented as the mobile terminal emits a single color of light or multiple colors of light to the front or back. The signal output from the light output unit 154 may be terminated as the mobile terminal detects the user's identification of the event.

The interface unit 160 plays a role as a pathway to all external devices connected to the mobile terminal. The interface unit 160 may receive data or power from the external device and transfer the same to each component in the mobile terminal or allow the data to be transmitted from the inside of the mobile terminal to the external device. For example, wired/wireless headset ports, external charger ports, wired/wireless data ports, memory card ports, ports for connecting identification module-equipped devices, audio input/output (I/O) ports, video I/O ports, or earphone ports may be included in the interface unit 160.

The identification module may be a chip storing various pieces of information for authenticating the authority to use the mobile terminal and may include, e.g., a user identity module (UIM), a subscriber identity module (SIM), or a universal subscriber identity module (USIM). A device having the identification module (hereinafter, an "identification device") may be formed as a smart card. Thus, the identification device may be connected with the terminal via the interface unit 160.

The interface unit 160 may serve as a pathway for supplying the power from an external cradle to the mobile terminal when the mobile terminal is connected to the external cradle or as a pathway for transferring various command signals input from the cradle by the user to the mobile terminal. Various command signals or power input from the cradle may be operated as signals for recognizing that the mobile terminal has been correctly mounted on the cradle.

The memory 170 may store a program for the operation of the controller 180. The memory 170 may temporarily store input/output data (e.g., phone books, messages, still images, or videos). The memory 170 may store data regarding various patterns of vibrations and sounds output when a touch is input onto the touch screen.

The memory 170 may include at least one type of storage medium of flash memory types, hard disk types, SSD (Solid State Disk) types, SDD (Silicon Disk Drive) types, multimedia card micro types, card types of memories (e.g., SD or XD memory cards), RAMS (Random Access Memories), SRAMs (Static Random Access Memories), ROMs (Read-Only Memories), EEPROMs (Electrically Erasable Programmable Read-Only Memories), PROMs (Programmable Read-Only Memories), magnetic memories, magnetic disks, or optical discs. The mobile terminal may be operated in association with web storage that performs the storage function of the memory 170 over the Internet.

As described above, the controller 180 controls operations related to the application program and may typically control the overall operation of the mobile terminal. For example, if the state of the mobile terminal meets a preset condition, the controller 180 may execute a lock state to restrict the user's input of control commands to the applications or release the lock state.

The controller 180 may perform control and processing related to, e.g., voice call, data communication, and video call and may perform pattern recognition processing for recognizing a writing and drawing input on the touch screen as text and an image, respectively. Further, the controller 180 may control any one, or a combination, of the above-described components so as to implement various embodiments, described below, on the mobile terminal of the disclosure.

The power supply unit 190 receives external power or internal power and supplies power necessary for the operation of each component under the control of the controller 180. The power supply unit 190 may include a battery. The battery may be an embedded rechargeable battery or may be detachably coupled to the terminal body for charging.

The power supply unit 190 may have a connection port. The connection port may be configured as an example of the interface 160 electrically connected with an external charger supplying power for charging the battery. As another example, the power supply unit 190 may be configured to charge the battery in a wireless manner without using the connection port. In this case, the power supply unit 190 may receive power from an external wireless power transmitter using one or more of a magnetic induction-based inductive coupling method or an electromagnetic resonance-based magnetic resonance coupling method.

FIGS. 10 and 11 are block diagrams illustrating an example stationary display device.

Referring to FIGS. 10 and 11, a display device may include a receiver 310, an external device interface unit 320, a display unit 340, an audio output unit 350, a power supply unit 360, a controller 370, and a user interface unit 380.

The receiver 310 may include a tuner 311, a demodulating unit 312, and a network interface unit 313. In some cases, the receiver 310 has the tuner 311 and the demodulating unit 312 but may not include the network interface unit 313 or vice versa. Although the receiver 310 is not shown, a multiplexer may be provided to multiplex the signal, which passes through the tuner 311 and is demultiplexed by the demultiplexing unit 312, and the signal received via the network interface unit 313. Although the receiver 310 is not shown, a demultiplexer may be provided to demultiplex the multiplexed signal, the demodulated signal or the signal which has passed through the network interface unit 313.

The tuner 311 may tune the channel selected by the user or all pre-stored channels among the radio frequency (RF) broadcast signals received via the antenna and receives RF broadcast signals. Further, the tuner 311 converts the received RF signal into an intermediate frequency (IF) signal or baseband signal. If the received RF signal is a digital broadcast signal, the tuner 311 converts the received RF broadcast signal into a digital IF signal (DIF) and, if the received RF signal is an analog broadcast signal, the tuner 311 converts the received RF broadcast signal into an analog baseband image or voice signal (CVBS/SIF). That is, the tuner 311 may process both digital broadcast signals and analog broadcast signals. The analog baseband image or voice signal (CVBS/SIF) output from the tuner 311 may be input directly to the controller 370.

The tuner 311 may receive RF broadcast signals of a single carrier or multiple carriers. The tuner 311 may sequentially tune and receive RF broadcast signals of all broadcast channels stored via the channel memory function among the RF broadcast signals received via the antenna and convert the same into intermediate frequency signals or baseband signals (DIF: Digital Intermediate Frequency or baseband signals).

The demodulating unit 312 may receive and demodulate the digital IF signal DIF converted by the tuner 311 and perform, e.g., channel decoding. To that end, the demodulating unit 312 may include, e.g., a trellis decoder, a de-interleaver, or a reed-solomon decoder or may include, e.g., a convolution decoder, a de-interleaver, and a reed-solomon decoder.

After performing demodulation and channel decoding, the demodulating unit 312 may output a stream signal TS. The stream signal may be a multiplexed signal of the image signal, sound signal, or data signal. As an example, the stream signal may be an MPEG-2 TS (Transport Stream) into which the MPEG-2 image signal and Dolby AC-3 sound signal have been multiplexed.

The stream signal output from the demodulating unit 312 may be input to the controller 370. The controller 370 may control, e.g., demultiplexing and image/sound signal processing and may control the output of images via the display unit 370 and the output of sound via the audio output unit 350.

The external device interface unit 320 provides an interfacing environment between the display device and various external devices. To that end, the external device interface unit 320 may include an input/output unit (not shown) or a wireless communication unit (not shown).

The external device interface unit 320 may be wiredly/wirelessly connected with, e.g., a digital versatile disk (DVD), Blu-ray, game device, camera, camcorder, computer (laptop computer), tablet PC, smartphone, Bluetooth device, cloud, or such external device. The external device interface unit 320 transfers the signal including the image, video, sound, or other various data input via the connected external device to the controller 370. The controller 370 may control to output the processed image, video, sound, or data signal to be output to the connected external device. To that end, the external device interface unit 320 may further include an input/output unit (not shown) or a wireless communication unit (not shown).

The A/V input/output unit may include a USB terminal, a CVBS (Composite Video Banking Sync) terminal, a component terminal, an S-video terminal (analog), a DVI (Digital Visual Interface) terminal, an HDMI (High Definition Multimedia Interface) terminal, an RGB terminal, and a D-SUB terminal.

The wireless communication unit may perform wireless communication with other digital devices. The multi-media device may be connected over a network with other digital devices, according communication protocols, such as WLAN (Wireless LAN), Wi-Fi (Wireless-Fidelity), Wi-Fi (Wireless Fidelity) Direct, Bluetooth, RFID (Radio Frequency Identification), IrDA (infrared Data Association), UWB (Ultra-Wideband), ZigBee, DLNA (Digital Living Network Alliance), or such communication protocols.

The external device interface unit 320 may be connected with a settop box (STB) via at least one of the above-described terminals to perform input/output operations with the settop box (STB). Meanwhile, the external device interface unit 320 may receive an application or application list in an adjacent external device and transfer the same to the controller 370 or memory 330.

The network interface unit 313 provides an interface for connecting the display device to a wired/wireless network including the Internet network. The network interface unit 313 may have, e.g., an Ethernet terminal for connection with a wired network and, for connection with a wireless network, the network interface unit 313 may use, e.g., WLAN (Wireless LAN) (Wi-Fi), Wibro (Wireless broadband), Wimax (World Interoperability for Microwave Access), HSDPA (High Speed Downlink Packet Access, Bluetooth™, RFID (Radio Frequency Identification), Infrared Data Association (IrDA), UWB (Ultra-Wideband), ZigBee, NFC (Near Field Communication), Wi-Fi (Wireless-Fidelity), Wi-Fi Direct, or Wireless USB (Wireless Universal Serial Bus).

The network interface unit 313 may transmit or receive data with another user or digital device via the network or another network linked to the network. The data stored in the display device may be transmitted to a user or digital device selected from among other users or other digital devices previously registered in the display device.

The network interface unit 313 may access a predetermined webpage via the network or another network linked to the network. That is, the network interface unit 313 may access the predetermined webpage via the network to transmit or receive data with the server. The network interface unit 313 may receive content or data provided from a content provider or network operator. That is, movies, advertisements, games, VOD, broadcast signals, or other contents, and information related thereto may be received from the content provider or network provider via the network. Further, firmware update information and update files may be received from the network operator. Further, data may be transmitted to the Internet or content provider or network operator.

The network interface unit 313 may select and receive a desired application from among open applications via the network.

The memory 330 may store a program for signal processing and control in the controller 370 and store signal-processed images, sounds, or data signals.

The memory 330 may perform a function for temporarily storing the images, sounds, or data signals input from the external device interface unit 320 or the network interface unit 313. The memory 330 may store predetermined broadcast channel-related information via the channel memory function.

The memory 330 may store an application or application list input from the external device interface unit 320 or the network interface unit 313. The memory 330 may store various platforms described below. The memory 330 may include at least one type of storage medium of flash memory types, hard disk types, multimedia card micro types, card-type memories (e.g., SD or XD memories), RAMs, or EEPROMs. The display device may play the content files (video files, still image files, music files, document files, or application files) stored in the memory 330 to the user. According to an embodiment, the memory 330 may be implemented to be included in the controller 370.

The user interface unit 380 may transfer signals input by the user to the controller 370 or transfer signals from the controller 370 to the user. The user interface unit 380 may receive power on/off, channel selection, screen configuration, or such control signals from the user input unit 300 and process the control signals, or the user interface unit 380 may perform processing so that control signals from the controller 370 are target display to the user input unit 300. The user input unit 300 may include one or more of wired input units that receive user inputs via a wired channel and wireless input units that receive user inputs via a wireless channel.

The user interface unit 380 may transfer control signals input from a local key (not shown), e.g., a power key, channel key, volume key, or settings key, to the controller 370.

The user interface unit 380 may transfer the control signal input from a sensing unit (not shown), which senses the user's gesture, to the controller 370 or may transmit the signal from the controller 370 to the sensing unit (not shown). The sensing unit (not shown) may include, e.g., a touch sensor, a voice sensor, a location sensor, or a motion sensor.

The controller 370 may demultiplex the stream input via the tuner 311, demultiplexing unit 312, or external device interface unit 320 or process demultiplexed signals to thereby generate and output signals for outputting an image or sound.

The controller 370 enhances the image quality of the image signal using the above-described image processing unit 100 and transmits the result to the display unit 340. The image signal image-processed by the controller 370 may be transmitted to the external output device via the external device interface unit 320.

The controller 370 may include, e.g., a demultiplexing unit or image processing unit. The controller 370 may control the overall operation of the display device. For example, the controller 370 may control the tuner 311 to thereby control to tune the RF broadcast corresponding to the channel selected by the user or a pre-stored channel.

The controller 370 may control the display device by an internal program or a user command input via the user interface unit 380. In particular, the controller 370 may allow the user to access the network and download her desired application or application list to the display device.

The controller 370 may control the tuner 311 to allow a signal of the channel selected according to a predetermined channel selection command received via the user interface unit 380 to be input. The controller 370 may process the image, sound, or data signal of the selected channel. The controller 370 may output the information for the channel selected by the user, along with the processed image or sound signal, via the display unit 340 or audio output unit 350.

The controller 370 may allow the image signal or sound signal input from the external device, e.g., a camera or camcorder via the external device interface unit 320 to be output via the display unit 340 or audio output unit 350 according to an external device image play command received via the user interface unit 380.

The controller 370 may control the display unit 340 to display the image. For example, the controller 370 may control to display, on the display unit 340, the broadcast image input via the tuner 311, the external input image input via the external device interface unit 320, the image input via the network interface unit 313, or the image stored in the memory 330. In this case, the image displayed on the display unit 340 may be a still image or video or may be a 2D image or 3D image.

The controller 370 may control the display device to play content. The content may be the content stored in the display device, received broadcast content, or external input content input from the outside. The content may be at least one of a broadcast image, external input image, audio file, still image, web screen accessed, and document file.

Upon entering into the application view item, the controller 370 may control to display an application or application list downloadable to the display device or from the external network.

The controller 370 may control to install and run the application downloaded from the external network, along with various user interfaces. Further, the controller 370 may control to display an image related to an executed application on the display unit 340 by the user's selection.

The display unit 340 converts the image signal processed by the controller 370, data signal, OSD signal, or image signal received from the external device interface unit 320, or data signal each into R, G, and B signals, thereby generating a driving signal. The display unit 340 may include a touch screen.

The audio output unit 350 may receive the signal sound-processed by the controller 370, e.g., stereo signal, 3.1 channel signal, or 5.1 channel signal, and output it as a sound. The audio output unit 350 may be implemented as various types of speakers.

To sense the user's gesture, the display device may further include a sensing unit (not shown) which includes at least one of touch sensors, sound sensors, position sensors, or motion sensors. The signal sensed by the sensing unit (not shown) may be transferred to the controller 370 via the user interface unit 380.

The display device may further include a recording unit (not shown) to record the user. The image information recorded by the recording unit (not shown) may be input to the controller 370. The controller 370 may use each, or a combination, of the image recorded by the recording unit (not shown) or the signal sensed by the sensing unit (not shown), thereby sensing the user's gesture.

The power supply unit 360 may supply power to the entire display device. The power supply unit 360 may include a converter (not shown) for converting AC power into DC power.

Referring to FIG. 13, the controller 370 may include, e.g., a demultiplexing unit 371, a decoding-related unit 372, an on-screen display (OSD) generating unit 373, an image processing unit 100, a mixer 374, a frame rate converter (FRC) 375, and a formatter 376. Although not shown, the controller 370 may further include a sound processing unit and a data processing unit.

The demultiplexing unit 371 demultiplexes the input stream. For example, the demultiplexing unit 371 may demultiplex the input MPEG-2 TS in to an image, sound, and data signal. Here, the stream signal input to the demultiplexing unit 371 may be the stream signal output from the tuner or demultiplexing unit or external device interface unit.

The decoding-related unit 372 decoding-processes the demultiplexed image signal. To that end, the decoding-related unit 372 may include an image decoder 372a and a scaler 372b. The image signal decoded by the decoding-related unit 372 may be input to the mixer 374.

The image decoder 372a decodes the demultiplexed image signal. The scaler 372b scales the resolution of the decoded image signal to be output from the display unit 340.

The image decoder 372a may support various standards. For example, the image decoder 372a may perform the function of the MPEG-2 decoder if the image signal has been encoded in the MPEG-2 standard and may perform the function of the H.264 decoder if the image signal is encoded in a DMB (Digital Multimedia Broadcasting) manner or H.264 standard. The raw image signal output from the image decoder 372a may be mapped for color gamut via the image processing unit 100 and may then be supplied to the mixer 374.

The OSD generating unit 373 generates OSD data according to a user input or by itself. The OSD generating unit 155 generates data for displaying various data, in the form of graphics or text, on the screen of the display unit 340 based on the control signal from the user interface unit 380. The generated OSD data includes various data, such as user interface screens (e.g., GUIs) of the display device, various menu screens, widgets, icons, or viewing rate information. The OSD generating unit 374 may generate data for displaying the subtitle for the broadcast image or EPG-based broadcast information.

The mixer 374 may mix the OSD data generated by the OSD generating unit 155 with the image signal output from the image processing unit 100 and provides the result to the formatter 376. As the decoded image signal is mixed with the OSD data, the OSD is overlaid on the broadcast image or external input image.

The frame rate converter (FRC) 375 converts the frame rate of the input image. For example, the frame rate converter 375 may convert the frame rate of the 60 Hz input image into, e.g., a frame rate of 120 Hz or 240 Hz, depending on the output frequency of the display unit 340. As described above, various methods may be provided to convert the frame rate. As an example, in the case of converting the frame rate from 60 Hz to 120 Hz, the frame rate converter 375 may perform such conversion by inserting the same frame as a first frame between the first frame and a second frame or inserting a third frame predicted from the first frame and the second frame. As another example, in the case of converting the frame rate from 60 Hz to 240 Hz, the frame rate converter 375 may perform such conversion by inserting three more frames, which are identical to an existing frame or are predicted, between existing frames. If no separate frame conversion is performed, the frame rate converter 375 may be bypassed.

The formatter 376 changes the output from the frame rate converter 375 to fit into the input signal format of the display unit 340. For example, the formatter 376 may output R, G, and B data signals, and such R, G, and B data signals may be output as low voltage differential signals (LVDSs) or mini-LVDSs. Further, if the output from the frame rate converter 375 is a 3D image signal, the formatter 376 configures and outputs a 3D form to fit into the input signal format of the display unit 340, thereby supporting the 3D service via the display unit 340.

The sound processing unit (not shown) in the controller 370 may perform sound processing on the demultiplexed sound signal. The sound processing unit (not shown) may support a processing of various audio formats. As an example, even when the sound signal is encoded in the format of, e.g., MPEG-2, MPEG-4, AAC, HE-AAC, AC-3, or BSAC, a decoder corresponding thereto may be provided for processing the signal. The sound processing unit (not shown) may perform processing, such as base, treble, or volume control.

The data processing unit (not shown) in the controller 370 may perform data processing on the demultiplexed data signal. For example, even when the demultiplexed data signal is encoded, the data processing unit may decode the signal. Here, the encoded data signal may be EPG information including broadcast information, such as the start time and end time of the program broadcast on each channel.

It will be appreciated by one of ordinary skill in the art that various changes or modifications may be made thereto without departing from the technical spirit of the disclosure. Thus, the technical scope of the disclosure is not limited to what has been described above but should be defined by the appended claims.

The invention claimed is:

1. A display device, comprising:
a linear color gamut mapping unit deriving a linear color gamut mapping result for matching a color gamut of an input image signal to a target display color gamut;
a non-linear color gamut mapping unit deriving a non-linear color gamut mapping result for matching the color gamut of the input image signal to the target display color gamut;
a mixing unit generating an output image signal by mixing the linear color gamut mapping result and the non-linear color gamut mapping result; and
an information analyzing unit analyzing color representation information included in the input image signal,
wherein the mixing unit adjusts a mixing ratio of the linear color gamut mapping result to the non-linear color gamut mapping result based on a result of the analysis by the information analyzing unit,
wherein the linear color gamut mapping unit obtains a matrix coefficient based on the result of the analysis by the information analyzing unit,
wherein the linear color gamut mapping result is derived using an M*M matrix having the matrix coefficient, M being a natural number,
wherein the non-linear color gamut mapping unit updates color gamut mapping information of a three-dimensional (3D) lookup table based on the result of the analysis by the information analyzing unit,
wherein the non-linear color gamut mapping result is derived using the 3D lookup table, and
wherein the mixing unit generates the output image signal according to RGBo=α*RGB1+(1−α)*RGB2, wherein RGBo denotes pixel data corresponding to the output image signal, RGB1 denotes pixel data corresponding to the linear color gamut mapping result, RGB2 denotes pixel data corresponding to the non-linear color gamut mapping result, and α denotes the mixing ratio.

2. The display device of claim 1, wherein
the color representation information includes meta data, brightness, saturation, and color for the input image signal.

3. The display device of claim 2, wherein
the information analyzing unit sets the mixing ratio by additionally analyzing user input information when there is a user input for adjusting the mixing ratio, and
the user input information includes user manipulation information for a graphic object for adjusting the mixing ratio and user selection information for selecting a color gamut different from the target display color gamut.

4. The display device of claim 3, wherein
the mixing unit re-adjusts the mixing ratio according to the user input information after primarily adjusting the mixing ratio according to the color representation information.

5. The display device of claim 1, wherein
the mixing unit increases a relative mixing ratio of the linear color gamut mapping result as the input image signal becomes closer to an achromatic color.

6. The display device of claim 1, wherein
the mixing unit increases a relative mixing ratio of the non-linear color gamut mapping result as the input image signal becomes closer to a chromatic color.

7. A method for processing an image by a display device, the method comprising:
deriving a linear color gamut mapping result for matching a color gamut of an input image signal to a target display color gamut;
deriving a non-linear color gamut mapping result for matching the color gamut of the input image signal to the target display color gamut;
generating an output image signal by mixing the linear color gamut mapping result and the non-linear color gamut mapping result; and
analyzing, by an information analyzing unit of the display device, color representation information included in the input image signal,
wherein the mixing includes adjusting a mixing ratio of the linear color gamut mapping result to the non-linear color gamut mapping result based on a result of the analyzing by the information analyzing unit,
wherein the deriving of the linear color gamut mapping result includes obtaining a matrix coefficient based on the result of the analyzing by the information analyzing unit,
wherein the linear color gamut mapping result is derived using an M*M matrix having the matrix coefficient, M being a natural number, wherein the deriving of the non-linear color gamut mapping result includes updating color gamut mapping information of a three-dimensional (3D) lookup table based on the result of the analyzing by the information analyzing unit, wherein the non-linear color gamut mapping result is derived using the 3D lookup table, and wherein the mixing includes generating the output image signal according to $RGBo=\alpha*RGB1+(1-\alpha)*RGB2$ wherein RGBo denotes pixel data corresponding to the output image signal, RGB1 denotes pixel data corresponding to the linear color gamut mapping result, RGB2 denotes pixel data corresponding to the non-linear color gamut mapping result, and $\alpha$ denotes the mixing ratio.

8. The method of claim 7, wherein
the color representation information includes meta data, brightness, saturation, and color for the input image signal.

9. The method of claim 8, wherein
the analyzing of the color representation information includes setting the mixing ratio by additionally analyzing user input information when there is a user input for adjusting the mixing ratio, and the user input information includes user manipulation information for a graphic object for adjusting the mixing ratio and user selection information for selecting a color gamut different from the target display color gamut.

10. The method of claim 9, wherein
the mixing includes re-adjusting the mixing ratio according to the user input information after primarily adjusting the mixing ratio according to the color representation information.

11. The method of claim 7, wherein
the mixing includes increasing a relative mixing ratio of the linear color gamut mapping result as the input image signal becomes closer to an achromatic color.

12. The method of claim 7, wherein
the mixing includes increasing a relative mixing ratio of the non-linear color gamut mapping result as the input image signal becomes closer to a chromatic color.

13. The display device of claim 1, further comprising:
a user interface configured to receive user input information including at least one of:
user scroll information for adjusting the mixing ratio, and
user selection information for selecting a color gamut different from the target display color gamut.

14. The display device of claim 1, wherein the display device is a TV, a monitor, or a mobile terminal.

* * * * *